United States Patent [19]
Dolezal et al.

[11] Patent Number: 5,904,905
[45] Date of Patent: May 18, 1999

[54] CORONA DISCHARGE POLLUTANT DESTRUCTION APPARATUS AND MANUFACTURE METHOD

[75] Inventors: Franklin A. Dolezal, Reseda; Weldon S. Williamson, Malibu, both of Calif.

[73] Assignee: Hughes Electronics Corporation, El Segundo, Calif.

[21] Appl. No.: 08/697,041

[22] Filed: Aug. 19, 1996

[51] Int. Cl.⁶ .................................................... B01J 19/08
[52] U.S. Cl. ........................ 422/186.04; 60/275; 588/227; 204/177
[58] Field of Search ............................. 422/186.04, 907; 60/275; 204/164, 177; 588/227

[56] References Cited

U.S. PATENT DOCUMENTS

| | | | |
|---|---|---|---|
| 3,188,167 | 6/1965 | Specht | 204/164 |
| 3,205,162 | 9/1965 | MacLean | 422/186.04 |
| 5,549,795 | 8/1996 | Gregoire et al. | 204/164 |
| 5,695,619 | 12/1997 | Williamson et al. | 204/165 |

FOREIGN PATENT DOCUMENTS

| | | |
|---|---|---|
| 0744802 | 11/1996 | European Pat. Off. . |
| 01242402 | 9/1989 | Japan . |

OTHER PUBLICATIONS

Rosocha, et al. "Treatment of Hazardous Organic Wastes Using Silent Discharge Plasmas" Non–Thermal Plasma Techniques for Pollution Control, NATO ASI Series, vol. G34, Part B, Ed. By B.M. Penetrante and S.E. Schultheis, Springer–Verlag Berlin Heidelberg, 1993 pp. 79–80. no month available.

Puchkarev, et al. "Toxic Gas Decomposition by Surface Discharge" Proceedings of the 1994 International Conf. on Plasma Science, Jun. 6–8(1994) Santa Fe, New Mexico, paper No. 1E6, p. 88. no month available.

Yamamoto, et al. "Decomposition of Volatile Organic Compounds by a Packed Bed Reactor and a Pulsed–Corona Plasma Reactor", Non–Thermal Plasma Techniques for Pollution Control , NATO ASI Series, vol. G34, Part B. Ed. By B.M. Penetrante and S.E. Schultheis Springer–Verlig Berlin Heidelberg, 1993, pp. 87–89. no month available.

*Primary Examiner*—K. Mayeuar
*Attorney, Agent, or Firm*—V. D. Duraiswamy; M. W. Sales

[57] ABSTRACT

A pollutant destruction apparatus has a corona discharge reactor attached to conductive end plates at the ends of the reactor. The reactor has inner and outer electrodes deposited respectively on the inner and outer surfaces of a hollow dielectric cylinder, the interior of which defines the reactor chamber. The inner electrode is electrically connected to the end plates, which are grounded, while the outer electrode is connected to a high-voltage power supply to establish a corona discharge. The outer electrode is tapered near the ends of the reactor to reduce the possibility of arcing. A hole in each end plate is aligned with the reactor chamber to allow gas flow into and out of the reactor.

33 Claims, 2 Drawing Sheets

CORONA DISCHARGE POLLUTANT DESTRUCTION APPARATUS AND MANUFACTURE METHOD

BACKGROUND OF THE INVENTION

1. Field of the Invention

This invention relates to a corona discharge pollutant destruction apparatus and method of fabrication.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge," *Proceedings of the 1994 International Conf. on Plasma Science*, Jun. 6–8, 1994, Santa Fe, N. Mex. paper No. 1E6, page 88. Corona pollutant destruction has also been proposed for liquids, as disclosed in application Ser. No. 08/295,959, filed Aug. 25, 1994, now U.S. Pat. No. 5,549,795, "Corona Source for Producing Corona Discharge and Fluid Waste Treatment with Corona Discharge," and assigned to Hughes Aircraft Company, now doing business as Hughes Electronics.

In one system, described in Yamamoto et al., "Decomposition of volatile Organic Compounds by a Packed Bed Reactor and a Pulsed-Corona Plasma Reactor," *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 5–10 keV. A similar system is described in U.S. Pat. No. 4,695,358, in which pulses of positive DC voltage are superimposed upon a DC bias voltage to generate a streamer corona for removing $SO_x$ and $NO_x$, from a gas stream. These processes have relatively poor energy efficiencies. It is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is actually used in the corona reaction, and simply decays away into heat after each pulse without contributing to the pollutant destruction.

A similar approach, but with a different reactor geometry, is taken in Rosocha et al., "Treatment of Hazardous Organic Wastes Using Silent-Discharge Plasmas", *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

A block diagram of a generic single-stage corona discharge pollutant destruction apparatus is shown in FIG. 1. A corona discharge reactor 2 takes pollutant-bearing exhaust gas 12 from an engine 6 through an inlet conduit 8, treats the exhaust gas, and discharges the treated gas 14 through an outlet conduit 10. Major pollutants in the exhaust gas 12 from the engine 6 include various forms of nitrogen oxides ($NO_x$), hydrocarbons (HC), and carbon monoxide (CO). HC and CO are considered high energy level pollutants, which can be oxidized to produce water ($H_2O$) and carbon dioxide ($CO_2$). $NO_x$ compounds are considered low energy level pollutants, and need to absorb energy to be reduced to harmless diatomic nitrogen ($N_2$) and oxygen ($O_2$). When a power source 4 supplies an alternating high voltage to the corona discharge reactor 2, HCs are oxidized to become $H_2O$ and $CO_2$, while CO is oxidized to become $CO_2$. At each voltage peak, corona charges are emitted within the reactor 2, producing free radicals that oxidize HC to generate $CO_2$ and $H_2O$ and CO to generate $CO_2$. In general, high voltages are very effective in destroying HC and CO, while low voltages are more desirable for the reduction of $NO_x$.

SUMMARY OF THE INVENTION

The present invention concerns a corona discharge pollutant destruction apparatus including a corona discharge reactor, and a method of manufacturing the apparatus.

The reactor comprises a hollow cylindrically shaped dielectric, the interior of which defines a reactor chamber, an inner electrode inside the chamber, and an outer electrode outside the dielectric. The inner electrode is preferably attached to the inner surface of the dielectric by a metal deposition, such as vapor deposition, to form a secure contact. Two end plates are provided for mounting the reactor to a single structure, and have access holes to allow a pollutant-bearing gas to flow into and out of the reactor. The outer electrode is a metallic layer on the outer surface of the dielectric, and its thickness is preferably tapered to zero at the ends of the dielectric cylinder to prevent arcing at the electrode's edges. The inner electrode is preferably connected to an outside power circuit by metallization at each end of the dielectric cylinder. The end plate has an attachment bead to securely hold the corona discharge reactor.

By using a reactor geometry that includes an inner electrode deposited on the inner surface of the dielectric, and providing an end plate to which the reactor is securely attached, the corona discharge apparatus as a whole is mechanically stable and is able to withstand vibrations and shocks expected in automotive applications. Furthermore, the inner electrode is grounded to avoid the possibility of burnout while the outer electrode has tapered ends to avoid arcing when energized by a high voltage, thereby making the reactor electrically safe.

These and other features and advantages of the invention will be apparent to those skilled in the art from the following detailed description, taken together with the accompanying drawings, in which:

DETAILED DESCRIPTION OF THE INVENTION

Figure 1:
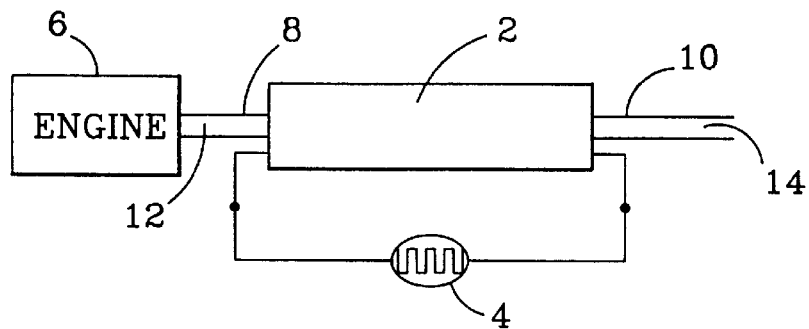
FIG. 1, described above, is a block diagram of a conventional corona discharge pollutant destruction apparatus.
Figure 3:
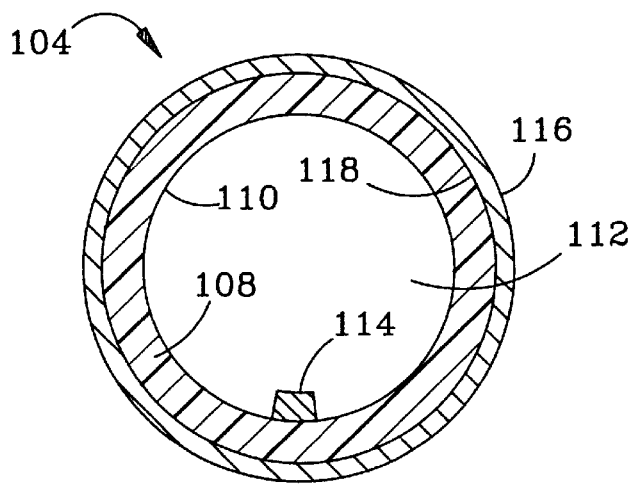
FIG. 3 is a sectional view of one embodiment of the corona discharge reactor of FIG. 2 taken along the sectional line 3—3 with a circular cross-section.
Figure 4:
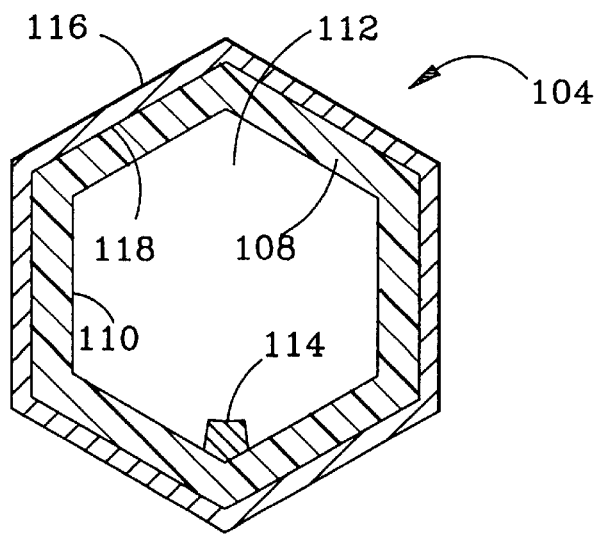
FIG. 4 is a sectional view of another embodiment of the corona discharge reactor of FIG. 2 with a hexagonal cross-section.
Figure 2:
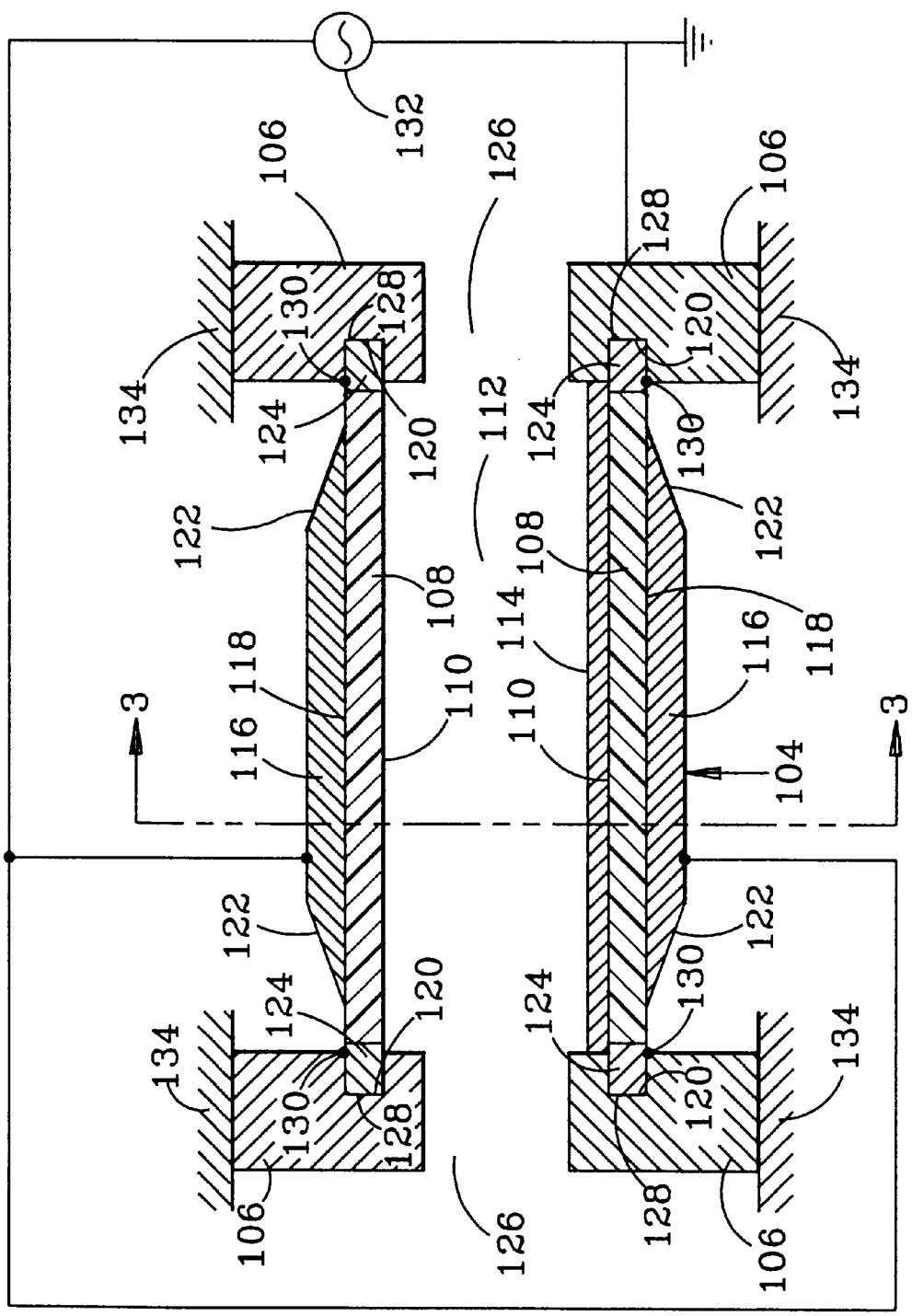
FIG. 2 is a sectional view of a corona discharge reactor mounted on two end plates.

In accordance with this invention, a preferred embodiment of which is shown in FIG. 2, a corona discharge reactor 104 is mounted to end plates 106, which are preferably made of metal. A major part of the reactor 104 is a hollow dielectric cylinder 108, preferably made from a material that has a melting point high enough to withstand the temperature generated by corona discharge and a low loss tangent at the drive frequency of the corona discharge, which is typically in the range of about 5–15 MHz. Examples of suitable dielectric materials include fused silica and high purity alumina. The dielectric cylinder 108 may have various cross-sectional shapes, but it is preferred that the cross-section be either circular or hexagonal, as shown in FIGS. 3 and 4, respectively. The choice of a particular cross-sectional shape depends upon the physical configuration of the pollutant destruction apparatus. If the apparatus employs a single reactor, the circular cross-section of FIG. 3 is preferred for its geometric simplicity and ease of manufacture. However, other cross-sectional shapes are also feasible for a single reactor. If the structure of the reactor is required to withstand a high degree of mechanical stress, it is preferred that the reactor have an equilateral hexagonal cross-section as shown in FIG. 4 for structural integrity.

Returning to FIG. 2, the hollow dielectric cylinder 108 has an inner surface 110 that defines a reactor chamber 112, through which the pollutant-bearing gas flows to be treated by corona discharge generated within the chamber. An inner electrode 114, which is made of a conductive material, preferably a metal, is positioned within the reactor chamber 112. The inner electrode 114 is preferably securely attached to and in intimate contact with the inner surface 110 of the dielectric cylinder 108 for mechanical support and heat dissipation. The inner electrode 114 can be attached to the inner dielectric surface 110 by conventional methods such as soldering or brazing. However, because the reactor chamber 112 generally has an elongate shape with a small cross-section compared to its length, it could be mechanically difficult to solder a wire inside the dielectric cylinder 108.

Other metal deposition technologies, such as vapor deposition, are preferred for attaching the inner electrode 114 to the inner surface 110 of the dielectric cylinder 108. Vapor deposition involves depositing a thin film of a metal on a surface by first evaporating the metal to a vapor form, and then condensing the metal vapor on the surface in a vacuum. For this invention, only a thin elongate portion of the inner surface 110 of the dielectric cylinder 108 need be metallized to form the inner electrode 114, and therefore the inner surface must be shielded except for the portion to be metallized when the metal vapor deposits on the surface. Shielding is preferably achieved by a tube liner that covers most portions of the inner surface 110 but exposes an elongate narrow surface that is to be metallized to form the inner electrode along the length of the cylinder's inner surface. The tube liner is removed from the reactor chamber after the metal vapor has condensed on the exposed portion of the inner surfaces 110 to form the inner electrode 114.

Regardless of the method of deposition, the inner electrode 114 preferably has a substantially uniform thickness along the length of the dielectric cylinder 108 to ensure that no portion of the inner electrode 114 is too thin to produce a large resistance that blocks current flow during a corona discharge. If the cross-section of the reactor chamber 112 is circular as shown in FIG. 3, the inner electrode 114 may be deposited at any cross-sectional location of the inner surface 110, as long as its location remains substantially constant along the length of the cylinder 108. If the cross-section of the chamber 112 is hexagonal as shown in FIG. 4, then the inner electrode 114 is preferably placed along a vertex of the hexagon so that electric field lines emanating from it reach the inner surface 110 on all six sides of the cylinder 108.

An outer electrode 116 is attached to the outer surface 118 of the dielectric cylinder 108, and is preferably a metallic layer deposited on the outer surfaces 118 by one of the deposition methods for the inner electrode described above. The outer electrode 116 is deposited on all portions of the outer surface 118 of the dielectric cylinder 108 and preferably has a substantially constant thickness except for a portion near each end 120 of the cylinder 108, where the thickness of the outer electrode 116 tapers to zero in a transition region 122. Tapering the outer electrode in this manner provides a downward grading of the voltage over the transition regions 122, thereby reducing the possibility of arcing at the outer electrode's edges when energized by a high voltage.

Only thin layers of metal need be deposited on the inner and outer surfaces of the dielectric to form the inner and outer electrodes, respectively. The inner and outer electrodes are generally much thinner than the dielectric. In FIG. 2, the thicknesses of the inner and outer electrodes are exaggerated to show the detailed structure of the reactor and the end plates.

A portion of the dielectric cylinder 108 at each end 120 of the reactor 104 is metallized to form a metal end 124, which is in intimate metallic contact with the inner electrode 114 for good electrical conduction. The thickness of the outer electrode 116 in the transition regions 122 falls to zero before it reaches the metal ends 124, and therefore the outer electrode 116 is electrically insulated from the metal ends 124 to prevent a short circuit between the inner and outer electrodes. The metal ends 124 are securely attached to the metal end plates 106 and form intimate electrical contacts with them. In a preferred embodiment, the end plates 106 are grounded, which means that the inner electrode 114 is grounded, while the outer electrode 116 is connected to carry a high voltage relative to the inner electrode for energizing a corona discharge within the reactor chamber 112. It is preferred that a voltage source 132 be connected to supply a sinusoidal voltage, with a voltage peak usually in the range of about 5–15 kV, to the outer electrode 116. If the apparatus is implemented in an automobile to treat its exhaust gas, the end plates 106 are preferably attached to the automobile's body or chassis 134, which is usually grounded. One advantage of grounding the inner electrode instead of the outer electrode is that the inner electrode, which has a much smaller cross-sectional area than the outer electrode and therefore has a larger resistance, need not carry a large current flow at times other than the instants of corona discharge, thereby protecting the smaller inner electrode.

The end plates 106 each have a hole 126 through which the exhaust gas flows into or out of the reactor chamber 112. The holes 126 are preferably aligned with the reactor chamber 112 to allow for a smooth flow of the gas. Each end plate 106 also has a recess 128 facing the respective metal end 124 of the reactor 104 with a size and a shape adapted to fit the metal end 124 tightly so that the end plates provide strong mechanical support for the reactor as well as intimate metallic contacts with the metal ends to ensure good electrical conduction between the grounded end plates and the inner electrode 114. The contacts between the metal ends 124 of the reactor 104 and the surfaces of the end plate recesses 128 should be airtight to prevent leakage of the pollutant-bearing gas into the atmosphere. To further strengthen the mounting for the reactor 104, an attachment bead 130 is preferably provided at the mouth of each recess 128 to provide even more frictional force between the reactor's metal ends 124 and the contacting surfaces of the recesses 128. In this configuration, the end plates 106 and the reactor 104 can first be manufactured separately, and then assembled together by aligning the reactor's metal ends 124 with the respective end plate recesses 128 and pushing the reactor 104 into the end plates 106.

In a preferred embodiment, both input and output ends of the corona discharge apparatus have substantially the same structure and are substantially symmetrical with each other. In a symmetrical configuration, the hole in one end plate provides an input for the pollutant-bearing gas flow and the hole in the other end plate provides an output.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A corona discharge pollutant destruction apparatus for treatment of a pollutant-bearing gas, comprising:
   a corona discharge reactor, comprising:
      a hollow dielectric cylinder having inner and outer surfaces and a central axis, said inner surface defining a reactor chamber;
      an outer electrode of a conductive material on the outer surface of said dielectric cylinder; and
      an elongate inner electrode of a conductive material supported by and in heat dissipation contact with said inner surface in an off-axis position with respect to said dielectric cylinder, said inner and outer electrodes adapted to generate a corona discharge within said reactor chamber upon high-voltage energization; and
   a first end plate attached to said corona discharge reactor, said end plate having an opening for a pollutant-bearing gas.

2. The apparatus of claim 1, wherein said corona discharge reactor further comprises an electrically conductive end on said cylinder which electrically connects said inner electrode to said end plate.

3. The apparatus of claim 2, wherein said end plate includes a recess which receives said reactor end to provide mechanical support for said reactor and an electrical connection between said end plate and said inner electrode.

4. The apparatus of claim 3, wherein said end plate further includes an attachment bead which strengthens said mechanical support and enhances said electrical connection.

5. The apparatus of claim 2, wherein said outer electrode has a thickness which tapers to zero near said reactor end, and is electrically insulated from said reactor end to prevent a short circuit between said inner and outer electrodes.

6. The apparatus of claim 1, wherein said end plate is grounded, and said outer electrode is adapted to support a voltage relative to said inner electrode.

7. The apparatus of claim 1, wherein said dielectric cylinder has a substantially circular cross-section.

8. The apparatus of claim 1, wherein said dielectric cylinder has a substantially hexagonal cross-section, and said inner electrode is positioned along a vertex defined by the intersection of two inner surfaces of said hexagon.

9. The apparatus of claim 1, wherein said end plate opening conducts a flow of said pollutant-bearing gas into said reactor chamber, further comprising an additional end plate of similar design to said first end plate, said additional end plate positioned at the opposite end of said reactor from said first end plate and including an opening adapted to conduct a flow of treated gas through said reactor chamber.

10. A corona discharge pollutant destruction apparatus, comprising:
    a corona discharge reactor, comprising:
       a hollow dielectric cylinder having inner and outer surfaces and a central axis, said inner surface defining a reactor chamber;
       a conductive outer electrode on said outer surface;
       a conductive elongate inner electrode supported by and in heat dissipation contact with said inner surface in an off-axis position with respect to said dielectric cylinder, said inner and outer electrodes adapted to generate a corona discharge within said reactor chamber upon high-voltage energization; and
    two end plates connected to respective ends of said reactor to provide mechanical support for said reactor.

11. The apparatus of claim 10, wherein at least one of said end plates is electrically conductive and is electrically connected to said inner electrode.

12. The apparatus of claim 11, wherein said end plate is grounded, and said outer electrode is adapted to support a voltage relative to said inner electrode.

13. The apparatus of claim 10, wherein said outer electrode has a thickness which tapers to zero near said reactor ends, and is electrically insulated from said reactor ends to prevent a short circuit between said inner and outer electrodes.

14. A method of manufacturing a corona discharge pollutant destruction apparatus, comprising:
    providing a hollow dielectric cylinder having inner and outer surfaces and a central axis, said inner surface defining a reactor chamber;
    forming an outer electrode on the outer surfaces of said dielectric cylinder;
    supporting an elongate inner electrode by and in heat dissipation contact with the inner surface of said reactor chamber in an off-axis position with respect to said dielectric cylinder; and
    attaching a first end plate to said dielectric cylinder to support said cylinder, said end plate including a first opening which aligns with said reactor chamber to provide a pollutant-bearing gas flow path through said reactor chamber.

15. The method of claim 14, wherein said inner electrode is attached to said inner cylinder surface by soldering.

16. The method of claim 14, wherein said inner electrode is deposited on said inner cylinder surface.

17. The method of claim 16, wherein said inner electrode is deposited on said inner cylinder surface by vapor deposition.

18. The method of claim 17, wherein said inner electrode is deposited by:
    shielding said inner cylinder surface except for a narrow elongate portion to be metallized;
    exposing said narrow elongate portion to a metal vapor; and
    condensing said metal vapor on said narrow elongate portion to form a metallic inner electrode in said reactor chamber.

19. The method of claim 16, wherein said outer electrode is deposited on said outer cylinder surface.

20. The method of claim 19, wherein the thickness of said outer electrode is tapered to zero near each end of said cylinder.

21. The method of claim 20, further comprising:
    providing respective metal ends at opposite ends of said dielectric cylinder; and connecting said end plate to one of said metal ends to establish an electrically conductive path between said end plate and said inner electrode.

22. The method of claim 21, wherein said end plate is attached to said dielectric cylinder by:

providing an additional end plate with a recess adapted to receive said metal end; and forcing said metal end into said recess to attach said end plate to said reactor.

23. The method of claim 22, further comprising:

providing an additional end plate of similar design to said first end plate, and attaching said additional end plate to the opposite end of said reactor from said first end plate.

24. An automobile with a restricted pollutant exhaust, comprising:

an automobile body;

an engine that emits a pollutant bearing exhaust gas from said body; and a corona discharge pollutant destruction apparatus connected to treat said exhaust gas, comprising:

a corona discharge reactor, comprising:

a hollow dielectric cylinder having inner and outer surfaces and a central axis, said inner surface defining a reactor chamber;

an output electrode of a conductive material on the outer surface of said dielectric cylinder; and an elongate inner electrode of a conductive material supported by and in heat dissipation contact with said inner surface in an off-axis position with respect to said dielectric cylinder, said inner and outer electrodes adapted to generate a corona discharge within said reactor chamber upon high-voltage energization; and a first end plate attached to said corona discharge reactor, said end plate having an opening for said pollutant-bearing gas.

25. The apparatus of claim 24, wherein said corona discharge reactor further comprises an electrically conductive end on said cylinder which electrically connects said inner electrode to said end plate.

26. The apparatus of claim 25, wherein said end plate includes a recess which receives said reactor end to provide mechanical support for said reactor and an electrical connection between said end plate and said inner electrode.

27. The apparatus of claim 25, wherein said outer electrode has a thickness which tapers to zero near said reactor end, and is electrically insulated from said reactor end to prevent a short circuit between said inner and outer electrodes.

28. The apparatus of claim 24, wherein said end plate is grounded, and said outer electrode is adapted to support a voltage relative to said inner electrode.

29. The apparatus of claim 24, wherein said end plate opening conducts a flow of said pollutant-bearing gas into said reactor chamber, further comprising an additional end plate of similar design to said first end plate, said additional end plate positioned at the opposite end of said reactor from said first end plate and including an opening adapted to conduct a flow of treated gas through said reactor chamber.

30. A corona discharge reactor, comprising:

a hollow dielectric cylinder having inner and outer surfaces and a central axis;

an outer electrode of a conductive material on the outer surface of said dielectric cylinder; and an elongate inner electrode of a conductive material supported by and in heat dissipation contact with said inner surface in an off-axis position with respect to said dielectric cylinder, said inner and outer electrodes adapted to generate a corona discharge within said cylinder upon high voltage energization.

31. The corona discharge reactor of claim 30, further comprising an electrically conductive mounting end on said cylinder electrically connected to said inner electrode, said outer electrode having a thickness which tapers downward near but spaced from said reactor end to insulate said outer electrode from said reactor end.

32. The corona discharge reactor of claim 30, wherein said dielectric cylinder has a substantially circular cross-section.

33. The corona discharge reactor of claim 30, wherein said dielectric cylinder has a substantially hexagonal cross-section and said inner electrode is positioned along a vertex defined by the intersection of two inner surfaces of said hexagon.

* * * * *